Jan. 3, 1928.

O. MANTIUS

APPARATUS FOR CONCENTRATING ACIDS

Filed Aug. 15, 1925

INVENTOR.
Otto Mantius
BY Jas. H. Griffin
ATTORNEYS.

Patented Jan. 3, 1928.

1,655,019

UNITED STATES PATENT OFFICE.

OTTO MANTIUS, OF ENGLEWOOD, NEW JERSEY.

APPARATUS FOR CONCENTRATING ACIDS.

Application filed August 15, 1925. Serial No. 50,362.

This invention is an apparatus for concentrating acids to any desired degree without detrimentally affecting the apparatus and without inherent danger to operatives.

The concentration of acids presents many mechanical, as well as chemical difficulties and problems. For example, cast iron, steel, copper and lead are attacked to a greater or lesser extent by many acids, and even lead, which is the most resistant, can only be used in the concentration of sulphuric acid up to a strength of about 60 degrees Baumé. Moreover, the boiling point of an acid rises with the density, so that, in the treatment of, for example, sulphuric acid, steam can only be used up to a density of about 60 degrees Baumé, while hot oil or mercury vapor must be employed for concentration of the acid above this density. Furthermore, in practice, acids generally contain more or less organic impurities which have a tendency to cause foaming during concentration of the acid and this foaming increases with the depth and volume of the acid. This is particularly true when a large body of acid passes through the foaming stage and results in appreciable commercial loss. The primary object of this invention is to minimize these disadvantages.

With the foregoing considerations in mind, and after the most careful and exhaustive experimentation, I have reached the conclusion that a very safe and durable apparatus can be constructed from acid-proof stoneware and high silicon iron, and have demonstrated that when suitably constructed, in accordance with this invention, such an apparatus can successfully handle strong acids, such as sulphuric, nitric, phosphoric and hydrochloric acid, either under atmospheric pressure or under a vacuum.

I have further invented a form of apparatus wherein the foaming of acids due to the presence of organic impurities is minimized. This foaming is due to the formation of gases and decreases with the increase of liberting surface, and in accordance with this invention, the liberating surface is made relatively great and the acid under treatment is so handled that the foaming of such acid does not occur in all of the acid under treatment at once and with a rush, but in such manner that the acid slowly passes through the foaming stage and in a more or less restricted zone of foaming which is not communicated throughout the entire body of acid under treatment.

In practically carrying out the invention in one of its preferred forms, the apparatus embodies a circuitous passage lined with acid-proof stoneware and suitably reinforced and stiffened. The acid is caused to flow, preferably by gravity, through this circuitous passage and into such passage extend heating elements preferably of high silicon iron which are submerged in the flow of acid and serve to heat the acid to the desired degree. The heating elements are so controlled that the progressively higher heat is applied to the acid inversely of the direction of flow; that is to say, the incoming acid is subjected to the lowest temperature and as it proceeds on its way it successively flows through consecutively higher temperatures to the end that the relatively weak acid entering the apparatus will be subjected to the lower temperature, while the acid leaving the apparatus will leave at the highest temperature. For practical reasons, the initial heating is preferably accomplished by steam and the subsequent heating by oil. This makes for economy and has other advantages which will be apparent to those skilled in the art, although it is to be understood that oil and mercury vapor may be employed successfully.

By circulating the acid through the circuitous passage and about submerged heating elements therein, the liberating surface of the acid is relatively great with respect to the heating surface exposed to the acid and these factors are very important in the reduction of the tendency of foaming and entrainment.

In further carrying out the invention, the circuitous passage for the flow of acid as described may be sealed exteriorly of the lining of acid-proof stoneware with a metallic skin, preferably lead, which will effectually preclude leakage of atmospheric pressure into the apparatus in the event the acid is treated under a partial vacuum and will at the same time prevent small leakage to the outside of the apparatus in case the concentrator is operated under atmospheric pressure.

The circuitous passage for the acid is provided at points along its length with outlets for the escape of vapors which find their way to a suitable compartment in the apparatus provided for the collection of these vapors and with this compartment communicates an entrainment separator from which the vapors are led to a condensor.

The apparatus of this invention will efficiently and safely concentrate or evaporate any of the strong acids to any desired degree without appreciable deterioration. It provides for a continuous operation, i. e., the acid is not dealt with in batches, and the concentration operation is carried out in a thoroughly economical manner.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1:
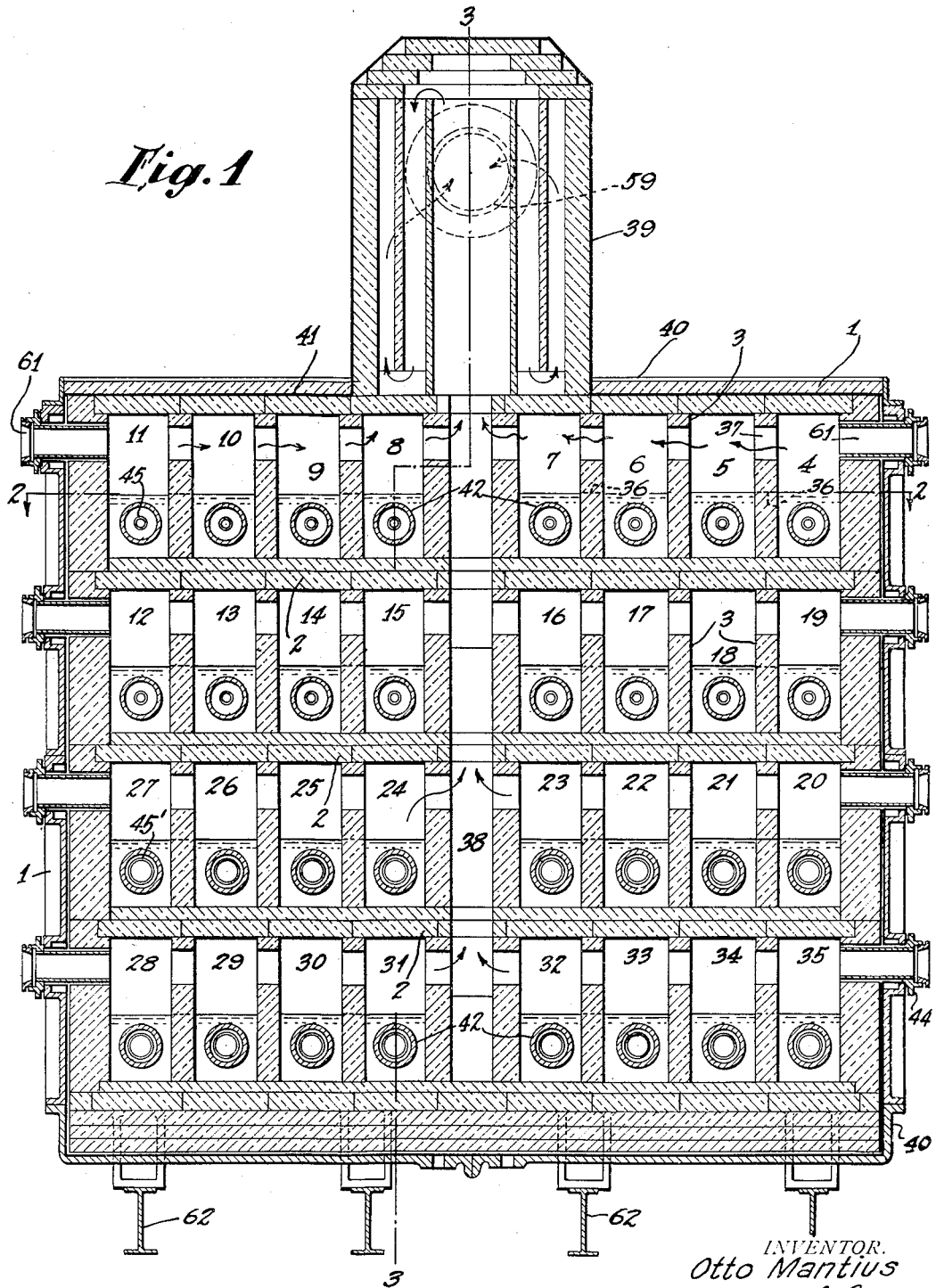
Figure 1 is a vertical section through apparatus embodying the present invention, this section being taken on the line 1—1 of Figure 3.

The concentrator shown in the drawings embodies a brick or stone structure 1 of substantially rectangular form, and the interior of which is divided by horizontal and vertical partitions 2 and 3 into a plurality of acid compartments 4 to 35, inclusive. Each of the acid compartments of each level is connected to the next one by an opening 36 positioned at the bottom of the compartment to permit the flow of acid from each of said compartments into the next until the acid in all of the compartments of such level has risen to a predetermined depth. Each vertical partition 3, moreover, is provided with an opening 37 near the top thereof, so that the vapors generated in the compartments during treatment of the acid can find their way to a vertical passage 38 which rises through the center of the apparatus and communicates with the interior of an entrainment separator 39.

The brick or stone structure 1 which has been described is preferably surrounded or housed within a suitable casing 40 in the form of a metal shell and I may, if desired, interpose between the stone or brick structure and the shell, a shell 41 of sheet lead which will prevent leakage to the outside in case the concentrator is operated under atmospheric pressure and will also prevent leakage of outside air into the interior of the concentrator when the apparatus is operated under a vacuum. In any case, there is practically no contact between the lead and the acid, as, with proper care, brick or stone work can be made absolutely tight, so that. if desired, the lead shell 41 may be omitted.

Figure 3:
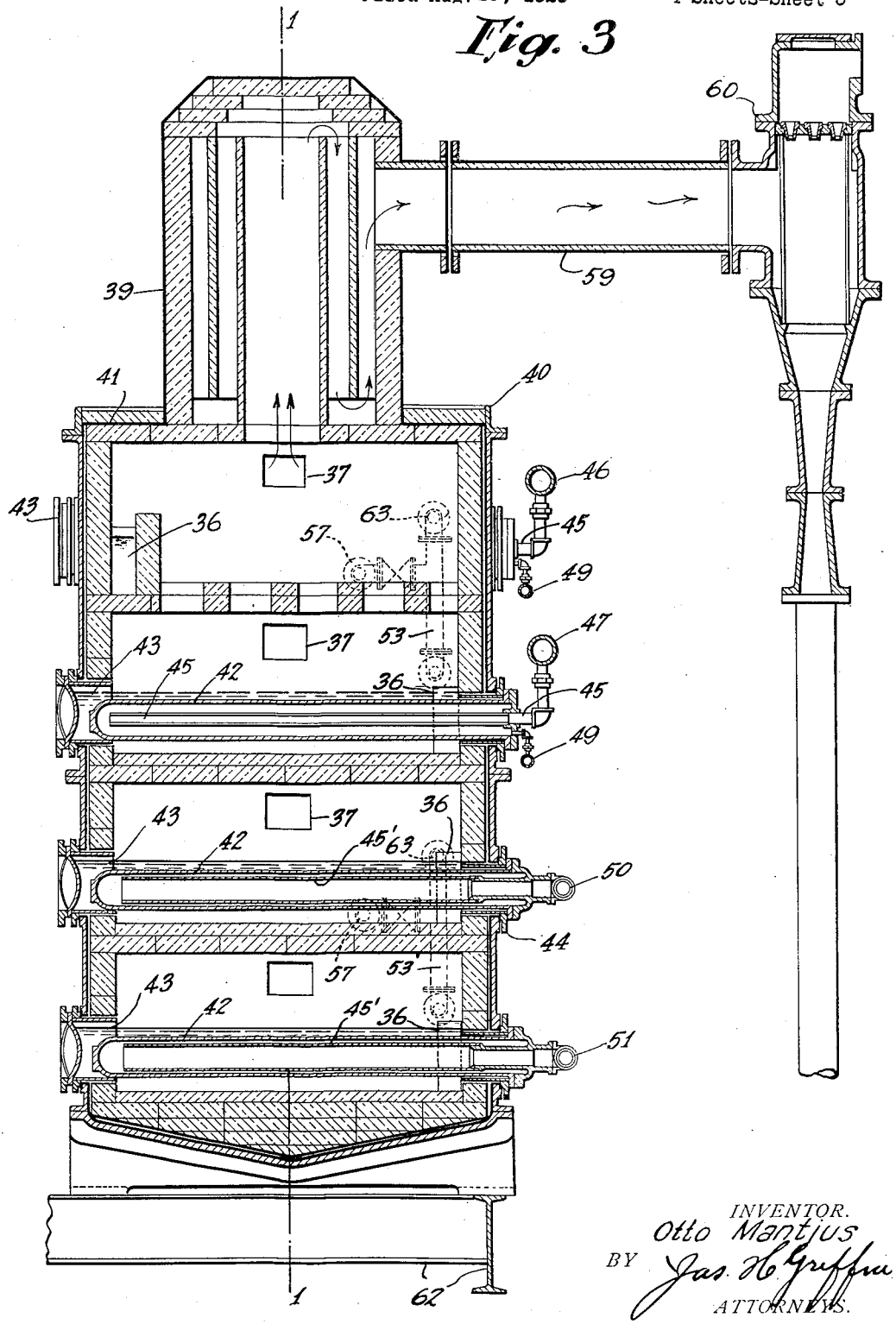
Figure 3 is a section on the line 3—3 of Figure 1.

The cast iron or steel shell 40 serves not only as a support for the brick or stone structure, but also forms a support for suitable heating elements 42, which are shown in the form of closed end tubes made of high silicon iron or other suitable metal and so disposed that one of these heating elements will project into each of the compartments 4 to 35 as clearly shown in Figure 3. Each of the said acid compartments extends the full width of the apparatus and is provided at its forward end with a hand hole 43. The open end of each of the tubes 42 is made tight in the outer shell 40 by means of a sleeve 44 of high silicon iron or other suitable acid-proof material, and the closed end of the tube rests in the circular hand hole opening, so that both ends of the tube are properly supported while allowing for the expansion and contraction of the tube. The hand holes 43 are preferably made so that they can be opened to permit of inspection and cleaning of the interior of the apparatus.

Figure 2:
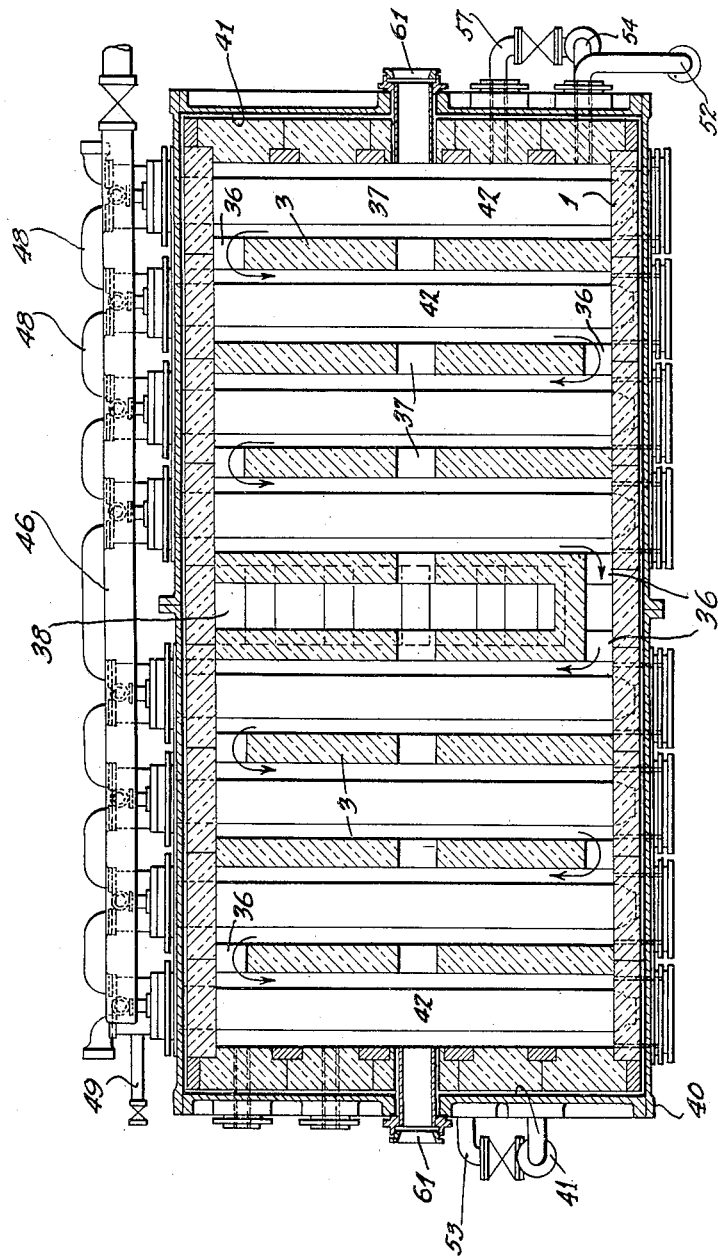
Figure 2 is a section on the line 2—2 of Figure 1.

It will be noted best from Figures 1 and 3 that each of the heating tubes 42 has a pipe 45 extending coaxially into it and through its open end and that about this pipe the open end of such tube is closed or sealed. The pipes 45 of the two upper sets of compartments, i. e., of the compartments 4 to 19, inclusive, are connected with headers 46 and 47 which supply steam at the desired temperature through the pipes 45 to the interiors of the corresponding heating tubes 42. Exteriorly of these pipes 45, the tubes 42 are consecutively connected by elbows 48, as shown in Figure 2, in order that proper circulation of the steam may be obtained. Return pipes 49 for spent steam and condensate are shown as associated with each of these two upper series of heaters in this latter figure.

The two lower series of heaters, i. e., those heaters which are associated with the compartments 20 to 35, inclusive, also have coaxial pipes 45', but they are preferably somewhat larger than the pipes 45 of the upper heaters and are connected to headers 50 and 51 by means of which hot oil is fed to the several heaters. The consecutive heaters are moreover connected with elbows corresponding to the elbows 48 and serving the purpose of providing for proper circulation of the oil.

Figure 4:
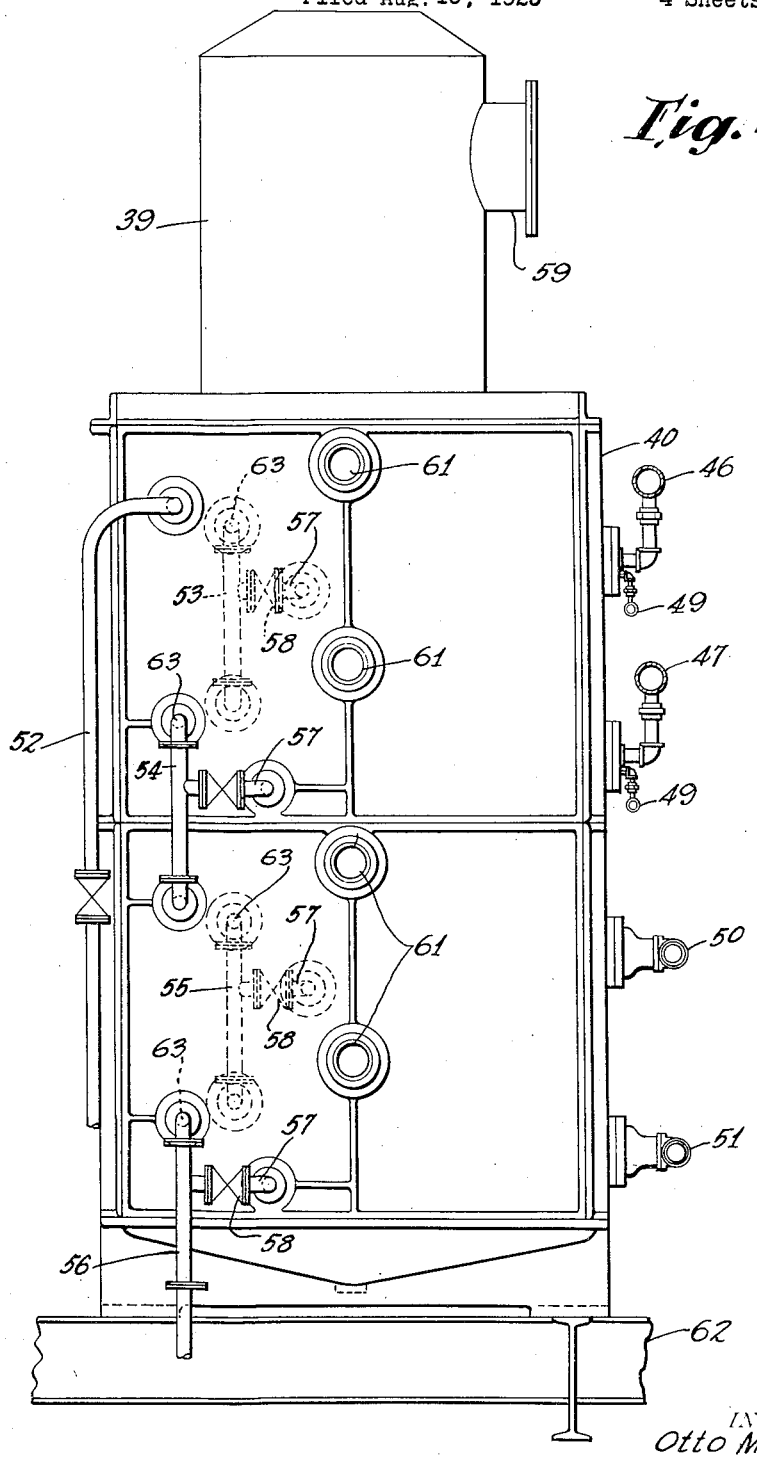
Figure 4 is an end elevation of the apparatus.

In the operation of the apparatus, weak acid is fed through a pipe 52 (see Fig. 4)

into one end of the uppermost end compartment 4, and from this compartment flows through the openings 36 into all the other compartments 4-11 of the uppermost series. As shown in Figure 2, the openings 36 are placed at opposite ends of consecutive compartments, so that as the acid fills the successive compartments 4-11, the flow of such acid will be as shown in the arrows in Figure 2. The operation continues until all the compartments of the uppermost series are properly charged, whereupon the acid overflows from the compartment 11 through an outlet port 63 and through an overflow pipe 53 (see Fig. 4) into the end compartment 12 of the next lower series and the consecutive compartments 12 to 19 are flooded. After these compartments have been charged, the acid overflows through an outlet port 63 and through an overflow pipe 54 into the compartment 20 and the compartments 20 to 27 are charged. The compartment 27 overflows through another outlet port 63 and through overflow pipe 55 into the first compartment 28 of the bottom series and the compartments 28 to 35 are filled to the level of draw off pipe 56. The acid flows out of the apparatus from the compartment 35 through said draw off or outlet pipe 56. Complete drainage of the several compartments is provided for by drain pipes 57 which have normally closed valves 58. By this arrangement a constant acid level is maintained in all of the compartments of the several superimposed series.

When the apparatus is in operation there is a constant flow of acid through the several compartments as described, while steam at the desired temperature is circulating in the heaters of the compartments 4 to 19, and oil at the desired higher temperature is circulating in the heaters of compartments 20 to 35. The weak acid enters through the inlet pipe 52 and as it flows through the consecutive compartments is progressively heated to higher temperatures in the consecutive compartments, concentration progresses until it is finally discharged through the outlet pipe 56. During this operation, the vapors and gases rising from the surface of the acid pass through the openings 37 to the outlet passage 38 and through the entrainment separator 39 to an outlet pipe 59 which leads to a suitable condensor 60.

The path of such vapors is shown by the arrows in Figures 1 and 3. It is well understood by those familiar with the concentration of acids that when acids are concentrated, there is a point of concentration at which a marked reaction takes place, due to the presence of organic matter that may be contained therein and this reaction tends to produce violent foaming. This phenomena is the source of considerable annoyance and loss where a relatively large body of acid, more or less suddenly passes through this stage of concentration.

Under prior practice, it has been common to treat the acid in bulk, so that the whole body of acid under treatment simultaneously passes through the foaming stage. When operating the apparatus of this invention, in contradistinction, the acid flows slowly through the compartments in succession and the flow is gradually brought up to the foaming point and gradually rises thereabove, so that at practically only one point in the flow and with only a relatively small amount of acid at this point, the transition or reaction stage occurs. That is to say, a whole body of acid is not simultaneously passed through this stage, but, in contradistinction, flows through this stage in relatively small quantities, so that the evolution of gases is minimized and the transition stage is relatively localized with a small amount of acid and in a relatively small length of the total amount of travel of the flow.

Foaming increases with the depth of the acid and decreases with the increase of liberating surface. With this in mind, it will be noted that the acid in each compartment is relatively shallow and that the liberating surface is relatively great in proportion to the heating surface of the heaters. Therefore, aside from the fact that only a relatively small portion of the acid passes through the foaming stage at any one time for the reasons given, the foaming is minimized. Moreover, the operatives can observe the action interiorly of the apparatus by looking through peep holes 61 provided at the ends of the apparatus.

The apparatus is supported on a suitable foundation, shown in the drawings as embodying I-beams 62 and the outer metal casing 40 is illustrated as formed in sections which are bolted or riveted together.

The apparatus of the present invention may be made in any size depending upon capacity desired and the structure may be divided into any desired number of compartments. It will be noted that, speaking generally, the structure is of cellular form, the several compartments 4 to 35 constituting the cells which are supported from one another by the partitions 2 and 3. These partitions not only serve the purpose of dividing the interior of the outer wall structure into cellular form, but further serve the purpose of properly reinforcing the entire construction, so that it will withstand pressures or partial vacuum.

When the apparatus is in operation, the successive compartments and intermediate openings 36 constitute collectively a circuitous passage into one end of which weak acid flows and from the opposite end of which the concentrated acid is discharged. The overflow outlets 63 are positioned so that no compartments can completely fill with acid, but a sufficient constant level of acid is maintained to keep the heating elements submerged.

As will be apparent to those skilled in the art, the concentrator is such that the temperature difference between the heating medium and the acid can be utilized to the fullest extent. The weak acid enters at the top and at this point there will be the greatest temperature difference and there the highest capacity, i. e., evaporation per square foot. The strong acid is discharged from the lowest compartment at a point where there is very little temperature difference between the acid and the heating element, and therefore the capacity of evaporation is very greatly reduced. This fact is especially important where hot oil is used as a heating medium, as it will permit a complete counterflow between the hot oil and the acid and by this method high temperature oil will cooperate with hot acid and relatively low temperature oil in contact with weak acid, which of course boils at a very much lower temperature than when concentrated.

Manifestly, hot oil may be used in all the heating elements, but it is essential to use steam and oil as hereinbefore described. For obtaining higher temperatures, however, mercury vapor may be used in either the last few compartments or in all of them. The invention is not restricted to the particular heating medium delivered to the heaters.

Especial stress is laid on the fact that in the ordinary type of concentrator, where a large amount of liquor is handled at one time, the whole mass of acid goes through the critical stage of foaming at one time and in actual practice it is impossible to control the foaming action of the acid without reducing the acid level to the lowest minimum, which operation, in itself, brings about a large decrease in capacity. The present invention entirely overcomes this difficulty as only a very small amount of acid is at the critical stage at any one time, while all the other acid in the apparatus is either weaker or stronger and therefore does not have the tendency to foam. Consequently, losses due to foaming are reduced to a minimum.

It will be further noted that the passage may be graphically described as having a lining of mineral material. That is to say, all that portion of the passage which is engaged by the acid is of mineral material, such as acid-proof stoneware or brick, so that the acid does not come in contact with any metal except the heating elements and the fittings about the hand holes. These holes permit access to the interior of the structure for cleaning and other purposes.

The foregoing detailed description deals with the invention in its preferred practical form, but the invention is to be understood as fully commensurate with the appended claims.

It will be apparent from the foregoing detailed description of the invention that such apparatus operates in accordance with the novel method of concentrating acids which forms part of this invention.

Having thus fully described the invention, what I claim as new and desire to secure by Letters Patent is:

1. In an acid concentrator, the combination of a closed circuitous passage provided with a vapor outlet, and an acid inlet and outlet and through which passage acid is adapted to flow from the inlet to the outlet, means for maintaining the acid at a predetermined level in said passage, heating elements spaced apart longitudinally of the passage and totally submerged in the acid for heating said acid to progressively higher temperatures in the direction of flow of the acid, whereby vapors evolved from the acid may be drawn off through the vapor outlet.

2. In an acid concentrator, the combination of a honeycomb cellular structure, the successive individual cells of which are interconnected to form a circuitous passage through which acid is adapted to flow, heating elements in said cells to heat the acid as it flows therethrough, and means for maintaining the acid in the cells at a level to totally submerge the heating elements.

3. In an acid concentrator, the combination of a honeycomb cellular structure, the successive individual cells of which are interconnected to form a circuitous passage through which acid is adapted to flow, heating elements in said cells to heat the acid to successively higher temperatures as said acid flows through the successive cells, and means to maintain the depth of acid in the cells sufficient to totally submerge the heating elements.

4. In an acid concentrator, the combination of a honeycomb cellular structure, the partitions of which are provided with openings through which acid introduced into one cell can flow into the other cells in succession, means for maintaining a constant acid level in the several cells, and heating elements extending into the individual cells and totally submerged in the acid therein for the purpose of heating said acid to the desired degree.

5. In an acid concentrator, the combination of a honeycomb cellular structure, the partitions of which are provided with openings through which acid introduced into one cell can flow into the other cells in succession, and said partitions also being provided with vapor outlets, means for maintaining a constant acid level in the several cells, heating elements extending into the individual cells and totally submerged in the acid therein for the purpose of heating said acid to the desired degree, and means for exhausting the vapors as they are formed.

6. In an acid concentrator, the combination of an outer wall structure, the confines of which are divided by horizontal and vertical partitions into a honeycomb cellular structure comprising a number of compartments, the vertical partitions between consecutive compartments being provided with openings to permit the flow of acid from one compartment into the others in succession and to permit of the outlet of generated vapors, ducts connecting the terminal compartments of superimposed series to permit the overflow of acid from an upper series of compartments to the next lower series of compartments and to maintain a constant acid level in the former compartments, heating elements in the individual compartments and totally submerged in the acid contained therein to heat said acid to the desired degree, and a conduit for carrying off evolved vapors.

In testimony whereof I have signed the foregoing specification.

OTTO MANTIUS.